April 14, 1959     A. A. BAKER ET AL     2,881,602
OPERATING MECHANISM FOR A WALL HYDRANT
Filed March 29, 1954
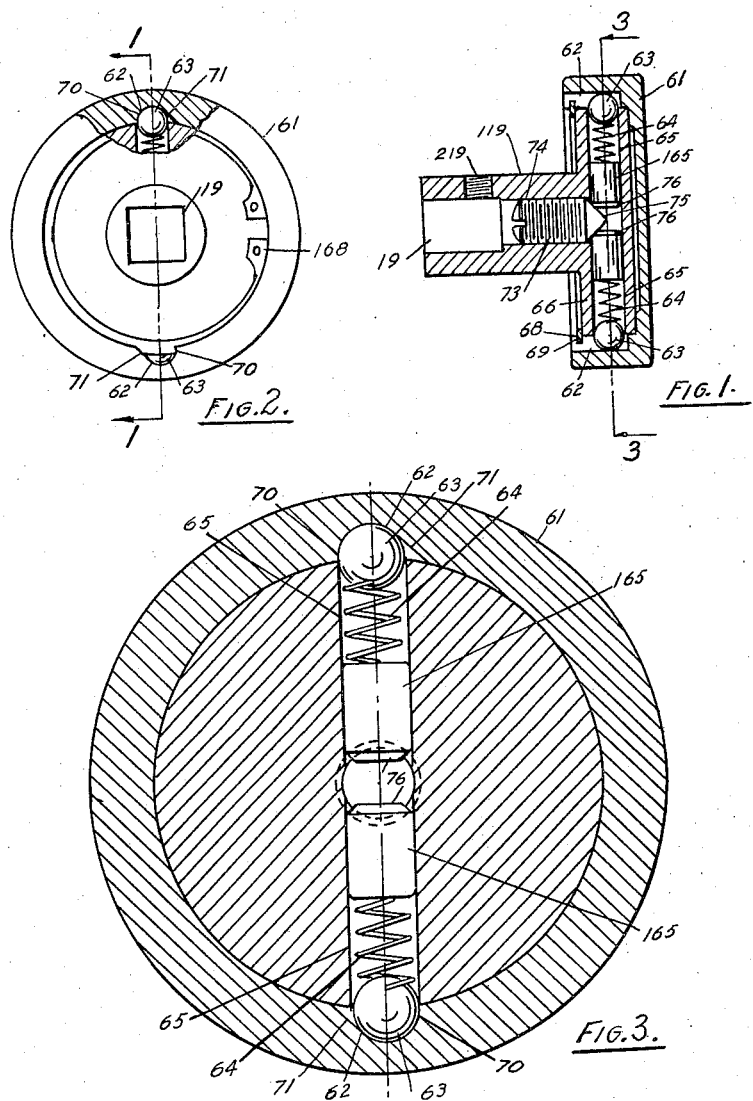

United States Patent Office 2,881,602
Patented Apr. 14, 1959

2,881,602

OPERATING MECHANISM FOR A WALL HYDRANT

Albert A. Baker and Harry L. Rhoades, Jr., Erie, Pa., assignors to J. A. Zurn Mfg. Co., Erie, Pa., a corporation of Pennsylvania Application March 29, 1954, Serial No. 419,162

3 Claims. (Cl. 64—29)

This invention relates generally to operating mechanism for hydrants and more particularly to operating mechanism for wall hydrants.

In hydrants made according to prior designs and with which we are familiar, there was no provision to prevent unauthorized persons from tightening the valve of the hydrant too much, thereby damaging the mechanism and valve thereof. It frequently happened that an unauthorized person would tighten the valve of the hydrant so tight that it was difficult to open the hydrant and, further, the mechanism thereof might be damaged and the parts mutilated.

It is, accordingly, an object of our invention to overcome the above and other defects in prior designs and more particularly an object of our invention is to provide a novel operating mechanism for a hydrant which is simple in construction, economical in cost, economical to manufacture, and efficient in operation.

With the above and other objects in view, the present invention consists of the combination and arrangement of the parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 1 is a transverse cross sectional view of a novel operating handle for our novel wall hydrant taken on line 1—1 of Fig. 2;

Fig. 2 is a view partly in cross section of our novel operating device; and

Fig. 3 is a cross sectional view taken on line 3—3 of Fig. 1.

The key or handle 119 is shown in detail in Figs. 1, 2, and 3. The key may be held on a rod or stem of a valve or other means to be operated by means of a set screw 219. The handle grip 61 has recesses 62 diametrically opposite to the camming members or balls 63. The balls 63 are urged outwardly by the springs 64 in a transverse hole 65 of the T-shaped head 66 of the stem socket 67 which constitutes the key or handle 119. The assembly is held together by a snap ring 68 which is C-shaped and terminates in the end 168 and which engages a groove 69 in the handle grip 61 and holds the head 66 in place therein.

The recesses 62 are provided with a shoulder 70 which engages the balls 63. Rotated in a clockwise direction, the balls 63 abut against the shoulder 70 and give a positive drive in this direction. The tapered surface 71 is inclined toward the center of the handle 119 to limit the clockwise torque used to close the valve by means of the rod to which the handle disclosed is attached; that is, when the torque exerted on the handle 119 in a clockwise direction exceeds a predetermined amount determined by the setting of the screw 73, the balls 63 will move along the cam surface 71 and the handle grip 61 will rotate relative to the rod 27 and will not rotate the rod 27.

The adjustment of the device is obtained as follows: The threaded screw 73 engages the internally threaded hole 74 in the handle 119 and has a tapered point 75 thereon which engages the tapered surfaces 76 on the ends of the spring urged plug members 165 in holes 65. When the screw 73 is tightened, that is, moved upward toward the members 165, the tapered edges 75 will move the members 165 outward to compress the springs 64 and, thereby, exert a greater force on the balls 63 and result in a greater torque required on the handle 119 to move the balls 63 out of the recesses 62 and, therefore, require greater torque on the handle 119 before it slips. Since when rotated in the other direction, the detent balls 63 will be against the shoulder 70, a positive drive will result in that direction.

In the foregoing specification, we have set forth the invention in its preferred practical forms but we are aware that the structure shown is capable of modification within a range of equivalents to without departing from the invention which is to be understood is broadly novel as is commensurate with the appended claims.

The embodiments of the invention in which an exclusive property or privilege is claimed are defined as follows:

1. An operator for the shaft of a valve comprising a handle member adapted to be non-rotatably mounted on a shaft and a cup-shaped handle grip rotatably mounted upon said handle member, clutching means for connecting said handle grip to said handle member, said clutching means comprising a camming member slidably mounted in a transverse bore formed in said handle member, said camming member adapted to engage a recess formed in the inner surface of the side wall of said handle grip which recess is defined by an upright surface and a tapered surface, spring means in said bore urging said camming member into engagement with said recess, a screw member threadably mounted in one end of an axially disposed bore formed in said handle member, said axially disposed bore intersecting said transverse bore and adapted to receive a shaft in the other end of same, means transmitting force from said screw member to said spring means to adjust the bias of said spring means on said camming member whereby said clutching means provides a positive connection between said handle grip and said handle member in one direction of rotation and a torque limiting means upon rotation of said handle grip in the other direction.

2. The operator recited in claim 1 wherein a second camming member is disposed in said transverse bore in said handle member in the opposite end thereof from said first mentioned camming member, and a second spring means engages said second camming member, and said force transmitting means urges said second spring means and said second camming member outwardly.

3. The operator recited in claim 1 wherein said means transmitting force from said screw member to said spring means comprises a tapered end on said screw member and a plug member slidably received in said transverse bore, said tapered end on said screw member engaging the inner end of said plug member, the outer end of said plug member engaging said spring means.

References Cited in the file of this patent

UNITED STATES PATENTS

| | | |
|---|---|---|
| 2,106,319 | Federighi | Jan. 25, 1938 |
| 2,157,574 | Siesel | May 9, 1939 |
| 2,288,859 | Valentine | July 7, 1942 |
| 2,373,812 | Coop | Apr. 17, 1945 |
| 2,608,377 | Streun | Aug. 26, 1952 |
| 2,634,650 | Coop | Apr. 14, 1953 |
| 2,687,141 | Baker | Aug. 24, 1954 |